United States Patent
Jáuregui Misas et al.

(10) Patent No.: US 9,235,106 B2
(45) Date of Patent: Jan. 12, 2016

(54) METHOD AND DEVICE FOR REDUCING MODE INSTABILITY IN AN OPTICAL WAVEGUIDE

(71) Applicants: FRAUNHOFER-GESELLSCHAFT ZUR FÖRDERUNG DER ANGEWANDTEN FORSCHUNG e.V., München (DE); FRIEDRICH-SCHILLER-UNIVERSITÄT JENA, Jena (DE)

(72) Inventors: César Jáuregui Misas, Jena (DE); Hans-Jürgen Otto, Jena (DE); Fabian Stutzki, Jena (DE); Florian Jansen, Jena (DE); Tino Eidam, Jena (DE); Jens Limpert, Jena (DE); Andreas Tünnermann, Weimar (DE)

(73) Assignees: FRAUNHOFER-GESELLSCHAFT ZUR FÖRDERUNG DER ANGEWANDTEN FORSCHUNG e.V., München (DE); FRIEDRICH-SCHILLER-UNIVERSITÄT JENA, Jena (DE)

( * ) Notice: Subject to any disclaimer, the term of this patent is extended or adjusted under 35 U.S.C. 154(b) by 0 days.

(21) Appl. No.: 14/391,840

(22) PCT Filed: Apr. 12, 2013

(86) PCT No.: PCT/EP2013/001071
§ 371 (c)(1),
(2) Date: Oct. 10, 2014

(87) PCT Pub. No.: WO2013/152862
PCT Pub. Date: Oct. 17, 2013

(65) Prior Publication Data
US 2015/0063767 A1    Mar. 5, 2015

(30) Foreign Application Priority Data
Apr. 12, 2012  (EP) .................... 12002588

(51) Int. Cl.
*G02F 1/365*    (2006.01)
*H01S 3/067*    (2006.01)
(Continued)

(52) U.S. Cl.
CPC ............ *G02F 1/365* (2013.01); *H01S 3/06737* (2013.01); *H01S 3/06787* (2013.01); *H01S3/06704* (2013.01); *H01S 3/06754* (2013.01); *H01S 3/094011* (2013.01); *H01S 3/1003* (2013.01); *H01S 3/10015* (2013.01); *H01S 3/1302* (2013.01)

(58) Field of Classification Search
CPC ...................................................... G02F 1/365
See application file for complete search history.

(56) References Cited

U.S. PATENT DOCUMENTS 7,835,608 B2    11/2010   Minelly et al.
2012/0069428 A1    3/2012   Limpert et al.

FOREIGN PATENT DOCUMENTS

JP    2003-023208 A    1/2003
WO    98/38710 A1      9/1998
(Continued)

OTHER PUBLICATIONS

Jauregui, C. et al: "Temperature-induced index gratings and their impact on mode instabilities in high-power fiber laser systems", Optics Express, vol. 20, No. I, Jan. 2, 2012, pp. 440-451.
(Continued)

*Primary Examiner* — Jerry Rahll
(74) *Attorney, Agent, or Firm* — Collard & Roe, P.C.

(57) ABSTRACT

The invention relates to a method and corresponding devices for reducing mode instability in an optical waveguide (1), a light signal becoming unstable in the optical waveguide (1) beyond an output power threshold and energy being transformed from a basic mode into higher order modes. The invention proposes a reduction in temperature variation (2) along the optical waveguide (1) and/or a reduction in changes in the optical waveguide (1) that are caused by spatial temperature variation as a result of mode interference.

18 Claims, 4 Drawing Sheets

(51) Int. Cl.
*H01S 3/10* (2006.01)
*H01S 3/13* (2006.01)
*H01S 3/094* (2006.01)

(56) References Cited

FOREIGN PATENT DOCUMENTS

| | | |
|---|---|---|
| WO | 2009/036942 A1 | 3/2009 |
| WO | 2010/102833 A1 | 9/2010 |

OTHER PUBLICATIONS

Jauregui, C. et al: "On the thermal origin of mode instabilities in high power fiber lasers", Proceedings of SPIE, vol. 8237, Jan. 23, 2012, pp. 82370D-1-82370D-6.
Kristian Rymann Hansen et al: "Thermo-optical effects in high-power Ytterbium-doped fiber amplifiers", Optics Express, vol. 19, No. 24, Nov. 21, 2011, pp. 23965-23980.
B. Ward et al: "Origin of thermal modal instabilities in large mode area fiber amplifiers", Optics Express, vol. 20, No. 10, May 7, 2012, pp. 11407-11422.
International Search Report of PCT/EP2013/001071, mailed Aug. 23, 2013.

METHOD AND DEVICE FOR REDUCING MODE INSTABILITY IN AN OPTICAL WAVEGUIDE

CROSS REFERENCE TO RELATED APPLICATIONS

This application is the National Stage of PCT/EP2013/001071 filed on Apr. 12, 2013, which claims priority under 35 U.S.C. §119 of European Application No. 12002588.7 filed on Apr. 12, 2012, the disclosures of which are incorporated by reference. The international application under PCT article 21(2) was not published in English.

The invention relates to a method and device for reducing mode instability in an optical waveguide. With mode instability, a light signal propagating through the optical waveguide becomes unstable beyond a threshold of the light signal power and energy is transformed from a basic mode into higher order modes.

Further development of fiber lasers in recent time has led to the fact that optical waveguides or optical fibers as active medium render a reliable concept for high-performance lasers, for example. The development of low-energy lasers to high-performance lasers for industrial applications is based on the capability of optical waveguides to handle high performance. The very good ratio of surface versus active volume allows for efficient discharge of heat. This constitutes an excellent prerequisite to high-performance operation. However, conditions in the optical waveguide entail other problems. For example, a restriction of the light signal on the core of the optical waveguide leads to high light intensity and to reciprocal effects between the material of the optical waveguide and the light signal, particularly causing hardly controllable non-linear effects. Signal quality is thus severely affected.

Multi-mode optical waveguides or multi-mode fibers in which a multitude of modes may propagate have a strongly structurized beam profile. In single-mode optical waveguides or single-mode fibers, which in most cases have a very small core diameter, only the so-called fundamental oscillation or basic mode can propagate, the intensity of which is approximately normally distributed in radial direction. The number of modes occurring influences signal transmission, because each mode takes a differently long light path. Therefore, multi-mode fibers show a stronger signal falsification (also called mode dispersion) than single mode fibers as length increases. Thus, single-mode optical fibers are better suitable for signal transmission over wide distances.

Accordingly, optical waveguides should be designed so as to reduce non-linear effects and reciprocal effects with the fiber material. The simplest and most effective way to reduce non-linear effects is by enhancing the core diameter. Thereby, the intensity of light in the core is reduced on the one hand, and on the other hand, for example in case of double-shell optical waveguides, the absorption of pump light can be increased. On account of improved absorption of pump light, the optical waveguide can be shortened, thus reducing non-linear effects.

With a big core diameter of the optical waveguide, however, it is difficult to implement a single-mode operation or even an operation with just a few modes, in particular in high-performance operation. To this effect, additional measures must be taken, above all in case of a high thermal load. However, it became evident that such measures may lead to mode instability at high performance rates. The output signal of the optical waveguide or of a fiber laser realized thereby becomes unstable as soon as a performance threshold is exceeded. Energy is transmitted from a basic mode into higher order modes. For example, the originally stable Gaussian beam profile of the radiation propagating in the optical waveguide begins to change and the beam profile fluctuates in terms of time due to a time-related variable overlap of the basic mode with one or more higher order modes. The time-related behaviour of these fluctuations may be deterministic or, depending on the power of the propagating radiation, accidental or chaotic.

Against this background, it is the object of the present invention to provide a method and device for stabilizing the output signal of an optical waveguide.

The invention achieves this object by diminishing the temperature variation along the optical waveguide and/or by reducing changes in the optical waveguide caused by spatial temperature variation because of mode interference. Advantageous embodiments result from the sub-claims.

To execute the method, one embodiment provides for a temperature control element for cooling and heating along the optical waveguide. The temperature control element is preferably configured as a cladding of the optical waveguide. Accordingly, temperature-induced local changes of the refractive index of the material of the optical waveguide are reduced, which are caused by mode interference, i.e. by interference of the different modes propagating in the optical waveguide. These local changes set one cause of mode instability which is thus reduced according to the present invention. The cladding, for example, can cool the optical waveguide at one end and warm it at the other end.

In a variation of this embodiment, the temperature control element is provided with at least one heating element and/or one cooling element along the optical waveguide in order to generate a variable course of temperature along the optical waveguide. The heating elements and cooling elements are preferably configured as Peltier elements. The heating and cooling elements can also be mounted directly on the optical waveguide or on the temperature control element. Thus, variable temperature profiles can be arbitrarily set and changed in terms of time along the optical waveguide, for example in order to actively stabilize the output signal from the optical waveguide.

In another embodiment for implementing the method, a coupler element, for example comprised of an active and/or a passive optical element, is provided for to control the coupling of an input signal into the optical waveguide. The active optical element, for example, may be an accousto-optical deflector, a computer-generated hologram, a pockels cell or an adaptive optics, for instance an adaptive mirror. Moreover, a control unit for picking-up the output signal from the optical waveguide in order to control and regulate the coupler element is preferably provided for. The control unit monitors the output signal and generates an actuating signal for inclencing the coupler element in order to thus stabilize the output signal.

A mode interference and thus a mode instability eventually results from the fact that at least two modes are excited when coupled into the optical waveguide. Therefore, a precise control of coupling-in leads to a reduction of mode instability. With the active optical element, the energy coupled into the modes and its relative phase can be determined. With the coupler element it is even possible to achieve that energy from the light signal is transmitted from a higher order mode in the optical waveguide into a basic mode. This leads to a cleaning effect of the light signal (also called "beam-cleaning" effect).

Another advantageous embodiment provides for an optical amplifier device with a beam splitter, preferably a polarization beam splitter, an optical amplifier element based on an optical waveguide, at least one optical mirror and at least one optical pump unit which pumps the amplifier element. Accordingly, the beam splitter divides an input signal into two light signals (preferably symmetrically), and the optical mirror feeds or couples-in a light signal at one end each of the amplifier element. On leaving the amplifier element, the light signals are finally guided back to the beam splitter and recombined to an output signal. A symmetrical arrangement, for example with power-identical light signals, and a pump unit at each end of the amplifier element has numerous advantages. For example, an asymmetrical warming of the optical waveguide, which leads to temperature variations and thus to mode instability, is avoided because at both ends of the amplifier element a signal is fed-in and amplified. With a symmetrical arrangement, the maximal temperature within the optical waveguide is also lowered because only part of the signal is amplified at each end. In particular as soon as the threshold of mode instability is reached at a first end of the optical waveguide and a change in the refractive index occurs in such a way that energy from the basic oscillation passes over into a higher order oscillation, this change at the same time causes a cleaning effect of the light signal propagating in opposite direction. In this manner, the beam quality is automatically improved. The stronger the non-linear effect through the first light signal at one end of the optical waveguide, the stronger is the cleaning effect on the second light signal propagating from the other end. When using a polarization beam splitter, it still results another advantage in that there does not occur any interference of the light signals propagating in opposite direction.

Another embodiment for implementing the method provides for that at least one actuator acts on the optical waveguide, preferably a piezoelectric actuator to generate vibrations in the optical waveguide. The actuator makes it possible to annul the refractive index change by interfering with the thermally induced refractive index change. To this effect, vibrations are transferred by the aid of the actuator to the optical waveguide. These vibrations propagate in the optical waveguide in form of an acoustic wave which changes the refractive index locally. With an appropriate harmonization of the vibrations (in terms of frequency and amplitude), thermally induced changes in the optical waveguide can be counteracted in a well-aimed manner. In a particularly advantageous embodiment, a piezoelectric actuator is mounted at one end (e.g. by the aid of a cap) to the optical waveguide, while attenuating elements are provided for at the other end. Thus, an acoustic wave can propagate in opposite direction to the direction of propagation of the light signal in the optical waveguide. With an appropriate frequency, and amplitude of the acoustic signal, a cleaning effect is thus brought about on the light signal, i.e. mode instability is reduced.

In another embodiment for implementing the inventive method, the optical waveguide is comprised of at least two differently endowed ranges. In a particularly advantageous embodiment, a passive core is provided in the surrounding of an active core of the optical waveguide, preferably in a pumping range of the optical waveguide, and an output signal of the active core can be completely or partly coupled into the passive core, i.e. in such a manner that the direction of propagation in the passive core is anti-parallel to the direction of propagation in the active core. Accordingly, the passive core is exposed to the associated refractive index changes in the same way as the active core. On account of the optical reciprocity of the system, the effect of the refractive index change is reversed when the output signal is fed-back via the passive core, and the resultant output signal of the passive core is very similar to the input signal of the active core.

A particularly preferred embodiment provides for a photonic-crystal fiber optical waveguide which has an arrangement of channels with a refractive index that is different to that of the matrix material of the optical waveguide, for example a lower refractive index.

Another embodiment for implementing the inventive method provides for a design of the optical waveguide in which a disparity of the signal overlap with an endowed range via a period of a mode floatation by modifying the geometry of the differently endowed ranges and/or by modifying the geometry of the optical waveguide is reduced. The profile of the light signal, i.e. the spatial distribution of the electromagnetic field of the light signal changes along the optical waveguide due to mode floatation. Thereby, the overlap with the endowed range of the optical waveguide (e.g. the endowed core) changes, too. And thus, the locally absorbed pumping rate also changes, and the longitudinal temperature distribution in the optical waveguide shows oscillations. A reduction in disparity reduces this effect and leads to an increased threshold of the mode instability.

In another embodiment, an endowed range of the optical waveguide is configured variable (e.g. in terms of the concentration of endowment) over the length of the optical waveguide, preferably in such a manner that the absorption of the pumping performance rate decreases over the length of the optical waveguide. Thus, the absorbed pumping performance rate is so changed that in the initial range of the optical waveguide more energy is absorbed than at the end. In this embodiment, an essentially flat temperature profile along the optical waveguide is achieved, thus increasing the threshold of mode instability.

In another embodiment for implementing the inventive method, it is provided for that a refractive index of the optical waveguide is configured variable over the length of the optical waveguide and/or variable over the cross-section of the optical waveguide. On account of the thermo-optical effect, temperature variations in the optical waveguide change its optical properties. With a correspondingly chosen course of the refractive index along the optical waveguide in the cross-section in relation thereto, this can be counteracted in a well-aimed compensating manner in order to thus increase the threshold of mode instability.

In another embodiment of the inventive method, it is provided for that the optical waveguide has a tapering outer circumference or a variable surface ratio from a signal core to a shell or optical pump core, preferably the shell and/or signal core have a conical longitudinal section along the optical waveguide. Thus, the absorption of the pumping energy is adapted to the temperature variation along the optical waveguide.

Another embodiment for implementing the inventive method provides for that the optical waveguide is equipped with absorption elements. In a preferred embodiment, the absorption elements have an absorption spectrum in the range of the wavelength of the light signal, and further the absorption elements are preferably spread over the length and/or cross-section of the shell or cladding of the optical waveguide, that means in such a manner that an overlap in the cladding with higher order modes is greater than it is with the basic mode of the light signal. With an endowment with ytterbium, samarium, for example, may be an appropriate absorption element. One cause for mode instability is the multi-mode behaviour of the optical waveguide. The absorption elements in this embodiment function like mode filters. These change the mode behaviour of the optical waveguide and increase the threshold of mode instability. Alternatively, a mode filter may be provided only at the beginning of the optical waveguide. In a preferred embodiment, the shell is provided with a structure that is reflectant for the wavelength of the pumping energy and transparent for the wavelength of the light signal. In another embodiment, it is provided for that the absorption elements have an absorption spectrum in the range of the wavelength of an optical pumping signal, preferably the absorption elements are spread over the length and/or cross-section of the shell or cladding of the optical waveguide. Alternatively, silica glass can also be brought in an appropriately spatial distribution into the optical waveguide and be heated, for example, with a separate laser in a medium infrared range. Thereby, the temperature distribution in the optical waveguide can be selectively influenced in order to reduce mode instability. Instead of silica glass, other materials are also suitable which absorb in an appropriate wavelength range in combination with a corresponding radiation source for warming.

Another embodiment provides for that a basic mode and at least a higher order mode have a defined wave propagation in the optical waveguide. A preferred embodiment particularly provides for that the refractive index in the optical waveguide for the basic mode of the light signal is approximately identical to the refractive index for the higher order mode and/or that the basic mode propagates with a polarization orthogonally to the polarization of the higher order mode in the optical waveguide. Thus, the period number of the thermally induced refractive index variation is reduced. An embodiment in this regard is a photonic-crystal fiber in which the course of the refractive index of the basic mode intersects with the course of the refractive index of a higher order mode at the working wavelength, i.e. the wavelength of the light signal. This leads to an increase of the threshold of mode instability. In another embodiment, the optical waveguide has an index-anti-crossing for higher order modes in high-performance operation. In principle, an orthogonal polarization of basic mode and higher order modes completely avoids mode interferences and thus lead to an effective reduction of mode instability.

Another embodiment provides for that radial-symmetrical modes propagate in the optical waveguide only in the cross-section of the optical waveguide and/or that radial-symmetrical modes have an overlap with the basic mode, preferably in a photonic-crystal optical waveguide with a configuration of channels with a particularly lower refractive index deviating from the matrix material of the optical waveguide in such a manner that the channels have no mirrored symmetry.

In another embodiment for implementing the inventive method, it is provided for that the optical waveguide is formed from a material having a high thermal conductivity, preferably from a crystalline material like sapphire.

Further characteristic features, details, and advantages of the present invention result from the following description of practical examples based on the relevant figures, where.

The reference numbers and their meaning are summarized in the relevant list of reference numbers. In general, identical reference numbers designate identical components.

Figure 1:
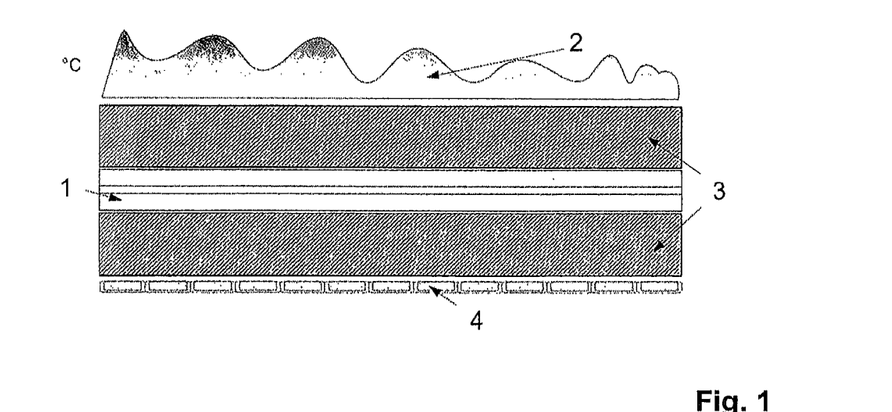
FIG. 1 shows an optical waveguide with a temperature control element and a temperature course along the optical waveguide.

FIG. 1 in a schematic representation shows an optical waveguide 1 with a temperature variation 2 generated by mode interference along the optical waveguide 1 and a temperature control element 3. The temperature control element 3 is provided for cooling and heating along the optical waveguide 1. In the illustrated embodiment, the temperature control element 3 is configured as a cladding of the optical waveguide 1. The temperature control element 3 can offset temperature variations 2 developing in high-performance operation and thus it diminishes a temperature gradient along the optical waveguide.

Furthermore provided for in this embodiment are heating elements and cooling elements 4 along the optical waveguide 1 to generate a variable course of temperature along the optical waveguide 1. By the aid of the heating and cooling elements 4, the course of temperature can be set variable over the length of the optical waveguide.

Figure 2:
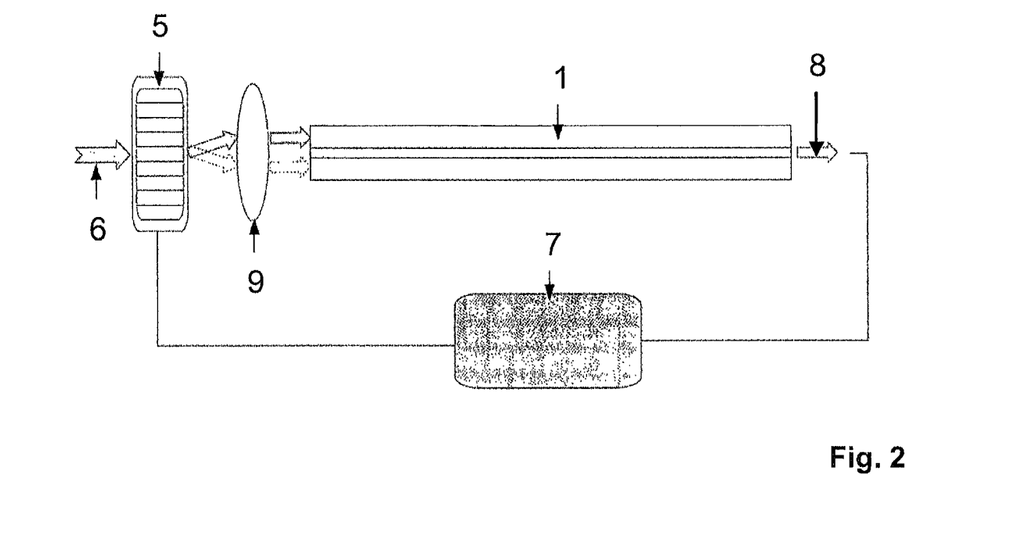
FIG. 2 shows an optical waveguide with an active coupler element and a control unit.

FIG. 2 in a schematic representation shows an optical waveguide 1 with an active coupler element 5 for an input signal 6 and a control unit 7 which picks-up an output signal 8 and thereof derives an actuating signal fed to the coupler element 5. The coupler element 5 is comprised of an active element and a passive element 9, for example an optical lens. The coupler element 5 controls the coupling-in conditions (e.g. coupling-in geometry and focusing) of the input signal into the optical waveguide 1. The control unit 7 evaluates the output signal 8, for example in order to determine a mode instability, and, if required, it changes settings of the coupler element 5 in order to stabilize output signal 8.

Figure 3:
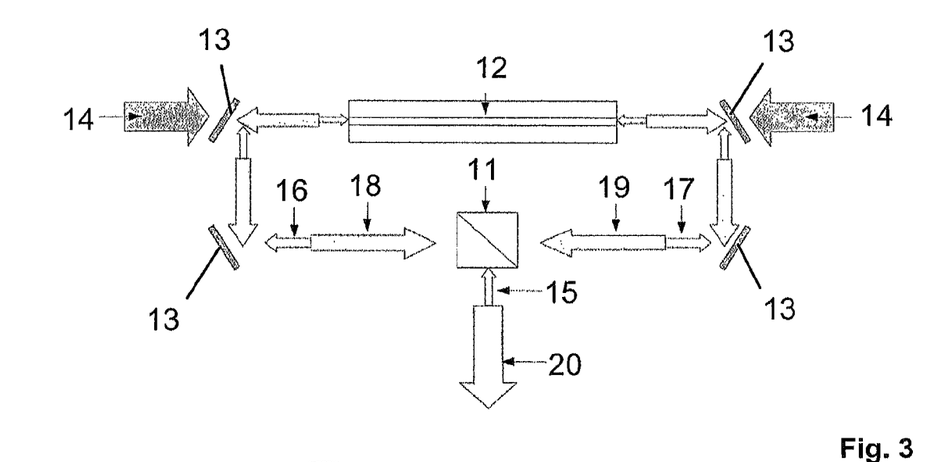
FIG. 3 shows an amplifier device with a beam splitter and an amplifier element.

FIG. 3 in a schematic representation shows an amplifier device 10 with a beam splitter 11 and an amplifier element 12. The amplifier element 12 is an optical waveguide 1 with an appropriate endowment. The amplifier device 10 is furthermore comprised of a mirror 13 and two optical pumping units 14.

The beam splitter 11 divides the input signal 15 into two preferably symmetrical light signals 16, 17 which are coupled via the mirrors 13 into the amplifier element 12. The signal 16 is coupled in at one end and the signal 17 at the other end of the amplifier element 12. The pumping units 14 are arranged each at the ends of the amplifier element 12, and optically pump the amplifier element 12 to amplify the signals 16, 17 at the relevant ends. On leaving the amplifier element 12, the amplified light signals 18, 19 are directed to the beam splitter 11 for recombination to an output signal 20.

Figure 4:
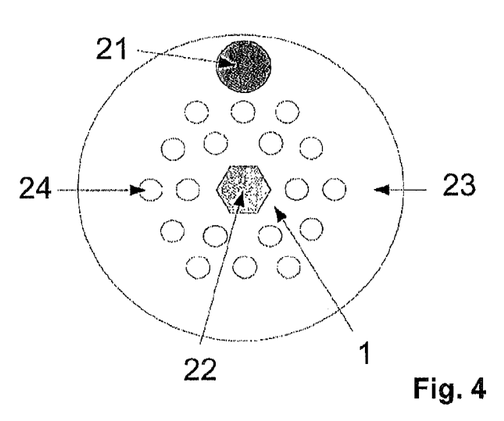
FIG. 4 shows an optical waveguide in a cross-section with an active and a passive core.

FIG. 4 in a schematic representation shows an optical waveguide 1 in a cross-section with a passive core 21 and an active core 22 in a pumping range 23 of the optical waveguide 1. Accordingly, an output signal of the active core 22 is partly or completely fed back into the passive core 21. The passive core 21 is exposed to the same temperature profile and thus to the associated changes in the refractive index as the active core 22. On account of the optical reciprocity of the system, the effect of thermal refractive index change is reversed when the output signal is fed back via the passive core 21, and the resultant output signal of the passive core 21 has a high signal quality.

Figure 5:
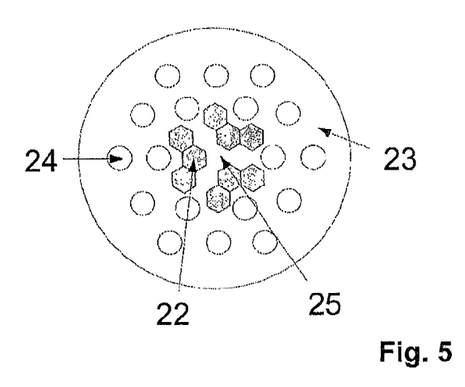
FIG. 5 shows an optical waveguide in a cross-section with a varied geometry of an active core.

FIG. 5 in a schematic representation shows an optical waveguide 1 in a cross-section with a varied geometry 25 of the active core 22. Accordingly, a disparity of the signal overlap in the range of the endowment over a period of one mode floatation is reduced. The geometry 25 is so adapted that it reduces temperature variations in the optical waveguide and thus increases the threshold of mode instability.

Figure 6:
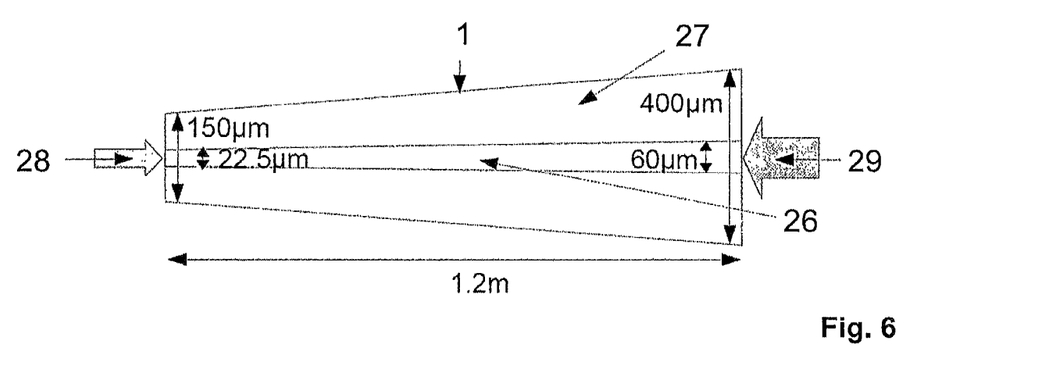
FIG. 6 shows an optical waveguide in a longitudinal section with a tapering cross-section.

FIG. 6 in a schematic representation shows an optical waveguide 1 with a tapering longitudinal cross-section, wherein the shell 27 and the signal core 26 each have a tapering longitudinal section. Thus, the absorption of the pumping energy is adapted to the temperature variation 2 along the optical waveguide 1.

Figure 7:
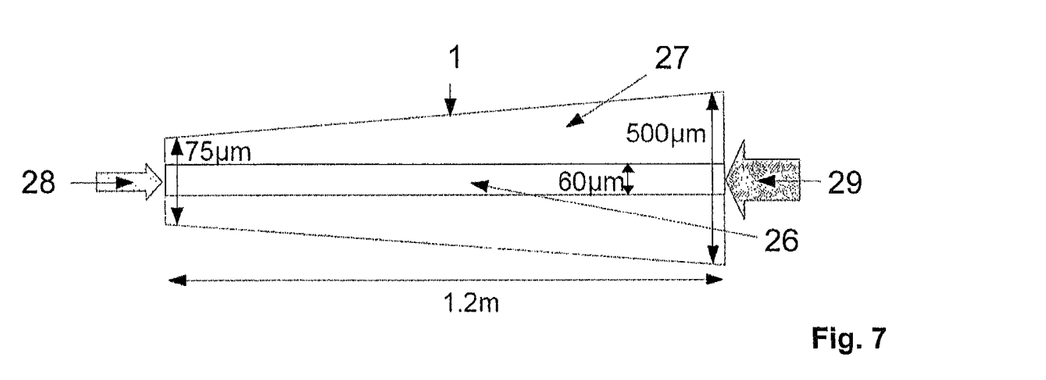
FIG. 7 shows an optical waveguide in a longitudinal section with a tapering shell

FIG. 7 in a schematic representation shows an optical waveguide 1 with a tapering longitudinal section, wherein only the shell 27 and not the signal core 26 is tapered. Thus, it is in particular possible to vary the surface ratio of signal core 26 versus shell 27.

Figure 8:
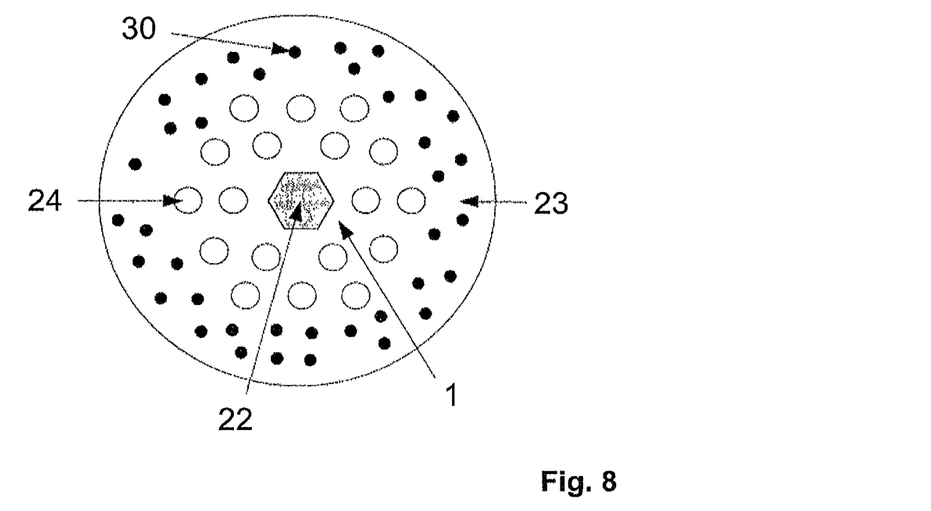
FIG. 8 shows an optical waveguide in a cross-section with absorption elements spread over the cross-section.

FIG. 8 in a schematic representation shows an optical waveguide 1 in a cross-section with the active core 22 with channels 24 in a pumping range 23 which have a low refractive index. Over its cross-section, the optical waveguide 1 is equipped with absorption elements 30. The absorption elements 30 have an absorption spectrum in the range of the working wavelength of the light signal propagating in the optical waveguide. The distribution of absorption elements 30 over the cross-section (and preferably also over the length) of the optical waveguide 1 is appropriately chosen in order to reduce mode instability. Accordingly, the overlap with higher order modes in the shell is greater than it is with the basic mode of the light signal. Over the length of the optical waveguide 1 in the direction of propagation of the light signal, the concentration of absorption elements 30 preferably decreases. The absorption elements 30 in this embodiment function as mode filters.

In another embodiment it is provided for that the absorption elements 30 have an absorption spectrum in the range of the pump wavelength. By way of an appropriate distribution of the absorption elements 30 in the optical waveguide 1, the absorption of energy can be controlled, whereby temperature variations 2 along the optical waveguide 1 can be diminished.

Figure 9:
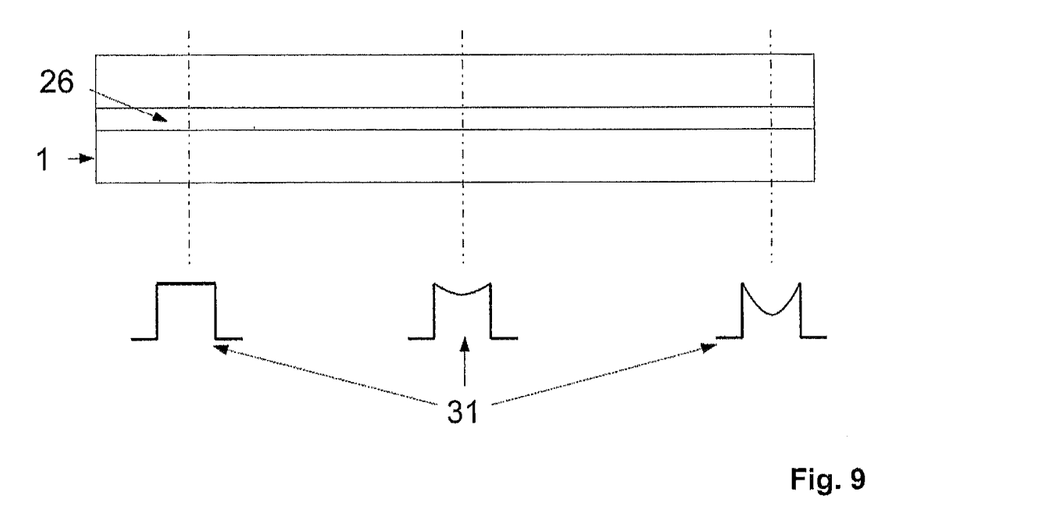
FIG. 9 shows an optical waveguide in a longitudinal section with a refractive index that is variable over the length of the optical waveguide.

FIG. 9 in a schematic representation shows an optical waveguide 1 in a longitudinal section with a variable radial refractive index course 31 over the length of the optical waveguide. The variable refractive index course 31 in the optical waveguide 1 (at least partly) compensates thermally induced variations in the course of the refractive index during active operation of the optical waveguide 1.

LIST OF REFERENCE NUMBERS

1 Optical waveguide
2 Temperature variation
3 Temperature control element
4 Heating/cooling element
5 Coupler element
6 Input signal
7 Control unit
8 Output signal
9 Optical instrument
10 Amplifier device
11 Beam splitter
12 Amplifier element
13 Mirror
14 Pumping unit
15 Input signal
16 Signal
17 Signal
18 Amplified signal
19 Amplified signal
20 Output signal
21 Passive core
22 Active core
23 Pumping range
24 Channels
25 Geometry
26 Signal core
27 Shell
28 Input signal
29 Pumping energy
30 Absorption elements
31 Refractive index

The invention claimed is:

1. Optical waveguide for high-performance operation to execute a method for reducing mode instability in the optical waveguide via reducing temperature variation along the optical waveguide and/or reducing changes in the optical waveguide that are caused by spatial temperature variation as a result of mode interference, the optical waveguide comprising an active coupler element for controlling the coupling of an input signal into the optical waveguide.

2. Amplifier device for executing a method for reducing mode instability in an optical waveguide via reducing temperature variation along the optical waveguide and/or reducing changes in the optical waveguide that are caused by spatial temperature variation as a result of mode interference, with the amplifier device being comprised of a beam splitter, an optical amplifier element and at least one optical pumping unit, and with the beam splitter splitting an input signal into two light signals, wherein one light signal each is coupled-in at one end each of the amplifier element.

3. Optical waveguide for high-performance operation to execute a method for reducing mode instability in the optical waveguide via reducing temperature variation along the optical waveguide and/or reducing changes in the optical waveguide that are caused by spatial temperature variation as a result of mode interference, the optical waveguide having a refractive index configured variable over the length of the optical waveguide and/or variable over the cross-section of the optical waveguide.

4. Optical waveguide for high-performance operation to execute a method for reducing mode instability in the optical waveguide via reducing temperature variation along the optical waveguide and/or reducing changes in the optical waveguide that are caused by spatial temperature variation as a result of mode interference, the optical waveguide having a tapered outer circumference or a variable surface ratio of a signal core versus a shell.

5. Optical waveguide for high-performance operation to execute a method for reducing mode instability in the optical waveguide via reducing temperature variation along the optical waveguide and/or reducing changes in the optical waveguide that are caused by spatial temperature variation as a result of mode interference, wherein the optical waveguide viewed in its cross-section is comprised of at least two differently endowed ranges, a first range being a passive core in the surrounding of a second range of an active core of the optical waveguide, and with an output signal of the active core being completely or partly capable of being coupled into the passive core, in such a manner that the direction of propagation in the passive core is anti-parallel to the direction of propagation in the active core.

6. Optical waveguide for high-performance operation to execute a method for reducing mode instability in the optical waveguide via reducing temperature variation along the optical waveguide and/or reducing changes in the optical waveguide that are caused by spatial temperature variation as a result of mode interference, the optical waveguide comprising a temperature control element for cooling and/or heating along the optical waveguide.

7. Optical waveguide according to claim 6, wherein the optical waveguide viewed in its cross-section is comprised of at least two differently endowed ranges.

8. Optical waveguide according to claim 7, with an endowed range being variably configured over the length of the optical waveguide.

9. Optical waveguide according to claim 7, reducing a disparity of a signal overlap with an endowed range via a period of a mode floatation by modifying the geometry of the differently endowed ranges and/or by modifying the geometry of the optical waveguide.

10. Optical waveguide according to claim 6, with the temperature control element being provided with at least one heating element and/or one cooling element along the optical waveguide to generate a variable course of temperature along the optical waveguide.

11. Optical waveguide according to claim 6, further comprising at least one actuator to generate oscillations in the optical waveguide.

12. Optical waveguide according to claim 6, the optical waveguide being formed from a sapphire material.

13. Optical waveguide according to claim 6, further comprising absorption elements.

14. Optical waveguide according to claim 13, with the absorption elements having an absorption spectrum in the range of one wavelength of the light signal.

15. Optical waveguide according to claim 13, the absorption elements having an absorption spectrum in the range of one wavelength of an optical pumping signal.

16. Optical waveguide according to claim 6, with a basic mode and at least one higher order mode of the light signal having a defined wave propagation in the optical waveguide.

17. Optical waveguide according to claim 16, only radial-symmetrical modes propagating in the optical waveguide and/or only radial-symmetrical modes having an overlap with the basic mode.

18. Optical waveguide for high-performance operation to execute a method for reducing mode instability in the optical waveguide via reducing temperature variation along the optical waveguide and/or reducing changes in the optical waveguide that are caused by spatial temperature variation as a result of mode interference, wherein the optical waveguide is configured to cause a basic mode and at least one higher order mode of a light signal guided by the optical waveguide to have a defined wave propagation, and wherein an effective refractive index in the optical waveguide for the basic mode is approximately identical to an effective refractive index for a higher order mode and/or with the basic mode propagating with a polarization orthogonally to the polarization of the higher order mode.

* * * * *